March 22, 1932.  D. W. LLOYD. SR  1,850,510
CLUTCH
Filed May 17, 1929
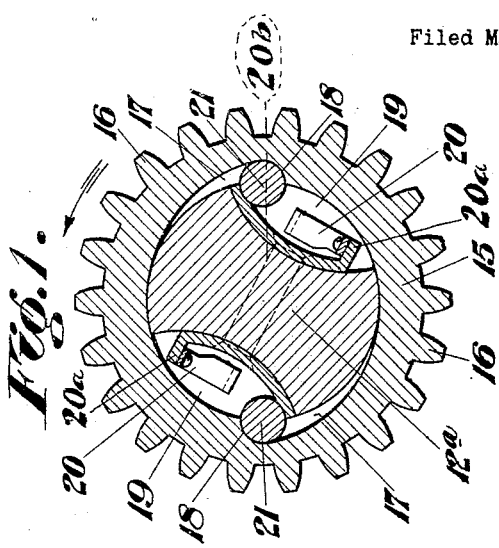
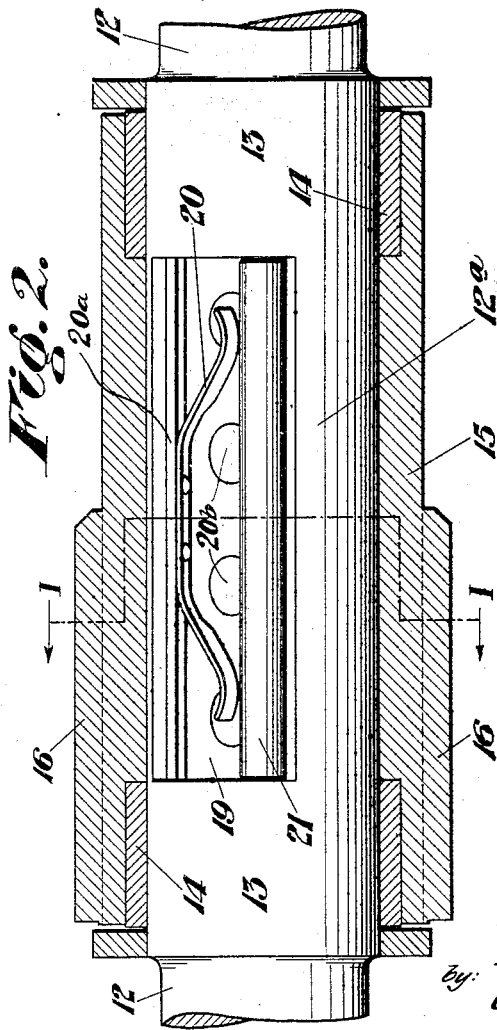
Inventor:
DONALD W. LLOYD, SR.
by Usina & Rauber
his Attorney.

Patented Mar. 22, 1932

1,850,510

UNITED STATES PATENT OFFICE

DONALD W. LLOYD, SR., OF YOUNGSTOWN, OHIO

CLUTCH

Application filed May 17, 1929. Serial No. 363,911.

This invention relates to the transmission of mechanical power and is for a clutch by means of which differential speeds may exist between a driving and a driven element.

The invention has for its object to provide a clutch of simple construction which can be cheaply manufactured and which is positive in its action.

The invention may be readily understood by reference to the accompanying drawings which illustrate certain preferred embodiments of my invention and in which—

Figure 1 is a transverse section on the line I—I of Fig. 2;

Figure 2 is a view partly in section and partly in elevation, the inner element of the clutch being shown in elevation and the outer element being shown in longitudinal vertical section.

In the drawings, 12 designates a shaft having bearing surfaces 13 thereon. On the bearing surfaces 13 are bushings 14. Rotatably mounted on the bushings 14 is an outer sleeve member 15 having gear teeth 16 thereon. On the inside of the outer member 15 are wedge-shaped cavities or recesses 17 terminating in shoulders 18.

The portion 12$^a$ of the shaft 12 intermediate the bearing surfaces 13 is provided with recesses 19. Leaf springs 20 are fixedly secured intermediate their ends to brackets 20$^a$ in the recesses 19 and said brackets are riveted or otherwise secured to the shaft, as at 20$^b$. Elongated rollers 21 are mounted between the shaft 12 and sleeve 15 and the springs 20 have their ends projecting away from said brackets so that said ends will engage said elongated rollers 21 at points adjacent each end when said rollers move back into said recesses to normally urge said rollers into operative position.

Considering the outer element 15 as the driving element and the shaft 12 as the driven element, the outer element 15 is driven in the direction of the arrow in Figure 1. So long as the speed of the outer element 15 is equal to the speed of the shaft 12, rollers 21 located between the inner and outer elements engage the shoulders 18 and the shaft for transmitting motion from the outer member to the inner one.

When the speed of the shaft 12 is greater than the speed of the outer element 15 the rollers 21 are forced by the wedgelike formation of the cavities 17 into the recesses 19 against the leaf springs 20. The rollers 21 will slide in and out of the recesses 19 as long as the speed of the shaft 12 exceeds the speed of the outer member 15. Just as soon as the speed of the shaft 12 falls below the speed of the outer member 15 the springs 20 will force the rollers out into the position shown in Figure 1.

The provision of the springs 20 assures the positive movement of the rollers 21 to operative position.

The clutch is adapted to a wide variety of uses. It can be used in starting mechanisms for internal combustion engines, particularly those of motor vehicles. It is also adapted for use in rolling mills where clutches are necessary or desirable.

While I have shown and described a certain preferred embodiment of the invention, it will be understood that the invention is not confined to the particular construction herein illustrated. Obviously, also, either of the two elements may be the driving element and the other the driven element, as the gear would function equally well with the shaft were the inner member the driving element and the outer member the driven element. In such case, however, the direction of rotation would be reversed.

I claim—

A driving mechanism comprising, in combination, a shaft having portions of increased diameter at spaced points intermediate its ends forming bearing portions, a gear sleeve rotatably mounted on said bearing portions, said sleeve having its inner face provided with a pair of diametrically opposite recesses, at least one end of each of said recesses terminating in a concave shoulder, an elongated roller mounted in each of said recesses, said gear sleeve being the driving element, and said rollers being adapted to form self-releasing keys between said gear sleeve and said shaft and to be engaged between said concave shoulders of said recesses and concavities while said gear sleeve is rotating at the same or slightly greater speed than said shaft and to automatically move back into said recesses when said shaft rotates at a greater speed than said gear, a bracket mounted in each of said recesses in said shaft and a single leaf spring secured to said bracket in each of said recesses, said springs being so shaped that their end portions will engage said elongated rollers at points adjacent each end when said rollers move back into said recesses so as to normally urge said rollers into said operative position.

In testimony whereof, I have hereunto set my hand.

DONALD W. LLOYD, Sr.